March 10, 1931.  J. M. ANDERSEN  1,796,229
CIRCUIT CONTROLLER
Filed June 19, 1924  6 Sheets-Sheet 1
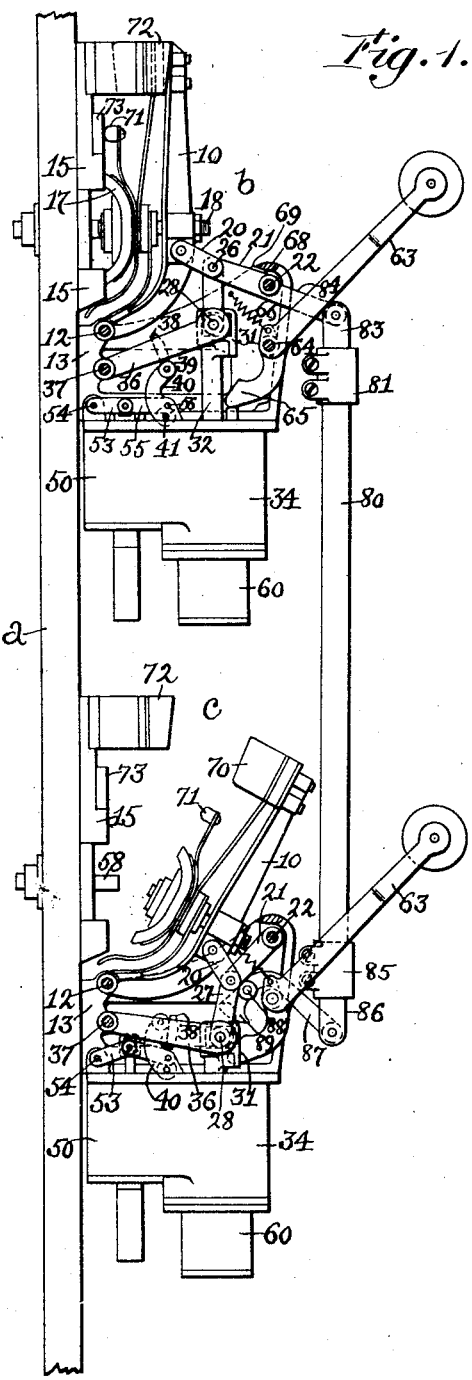
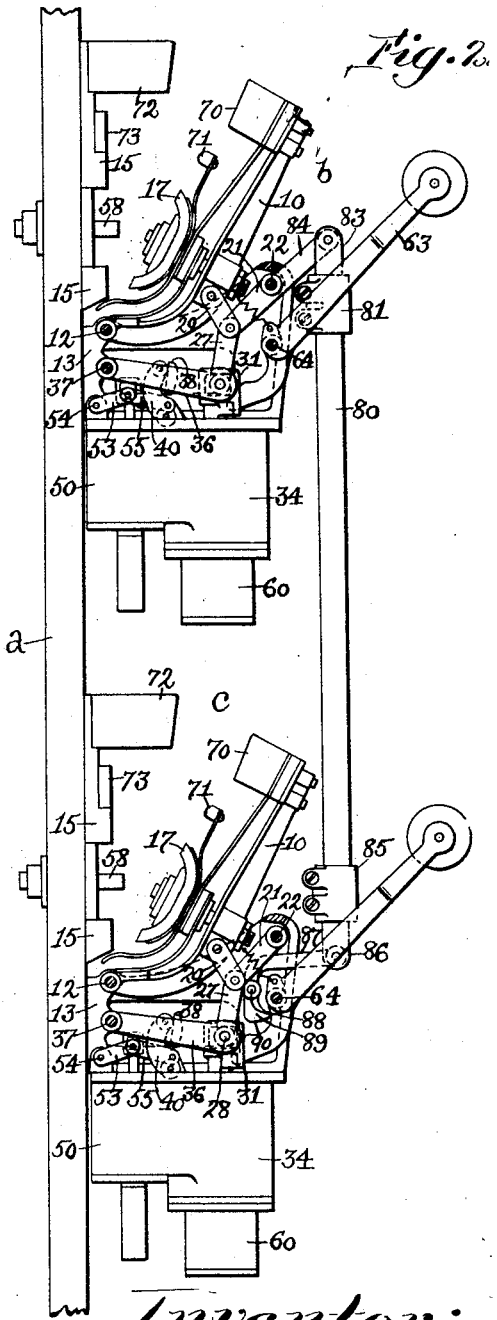
Inventor:
Johan M. Andersen
by Jas. H. Churchill
atty.

March 10, 1931. J. M. ANDERSEN 1,796,229
CIRCUIT CONTROLLER
Filed June 19, 1924 6 Sheets-Sheet 2

Inventor:
Johan M. Andersen
by Jas. H. Churchill
Atty.

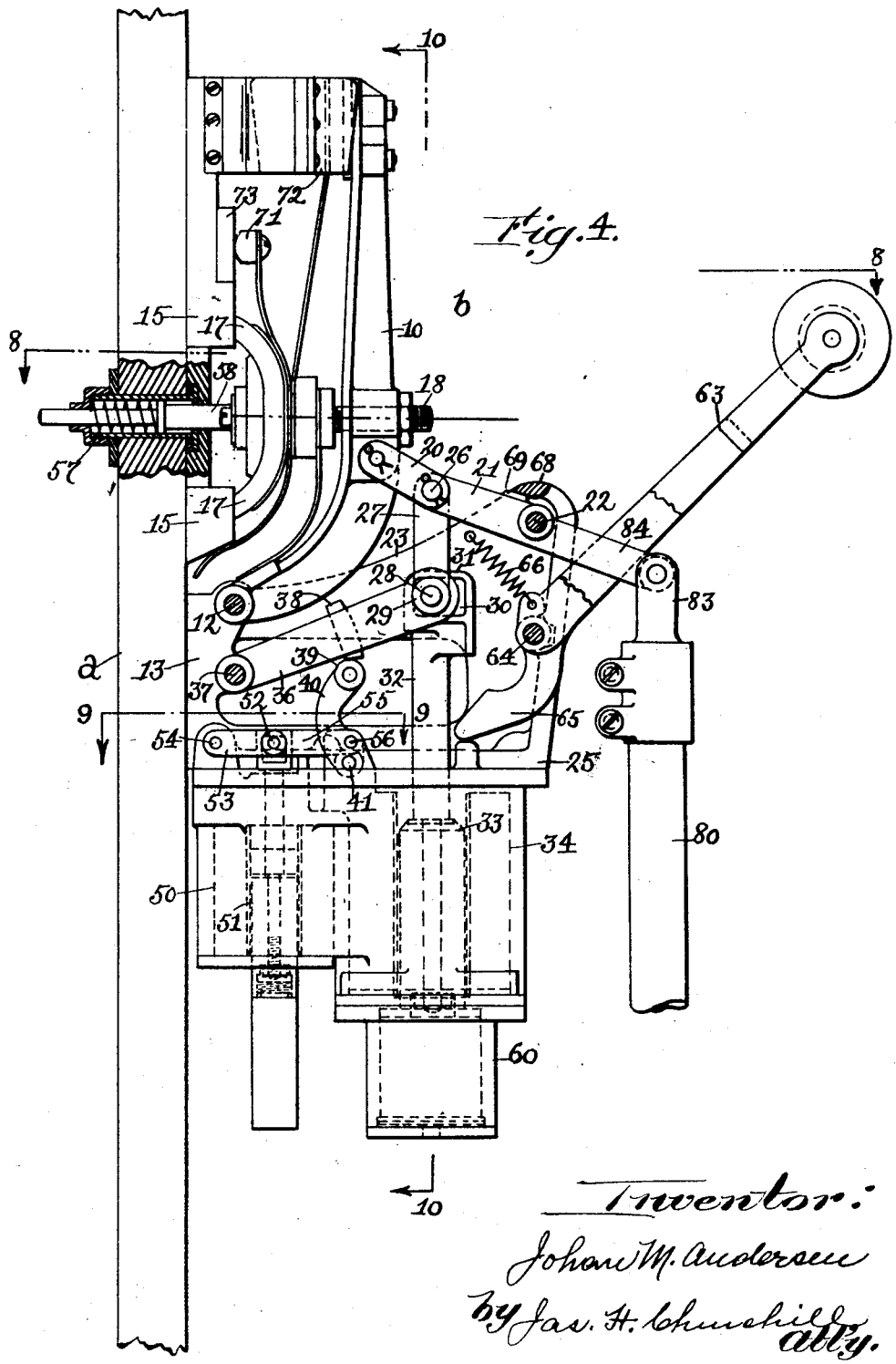

March 19, 1931. J. M. ANDERSEN 1,796,229
CIRCUIT CONTROLLER
Filed June 19, 1924  6 Sheets-Sheet 4

Inventor:
Johan M. Andersen
by Jas. H. Churchill
Atty.

March 10, 1931. J. M. ANDERSEN 1,796,229
CIRCUIT CONTROLLER
Filed June 19, 1924   6 Sheets-Sheet 5

Inventor:
Johan M. Andersen
by Jas. H. Churchill
atty.

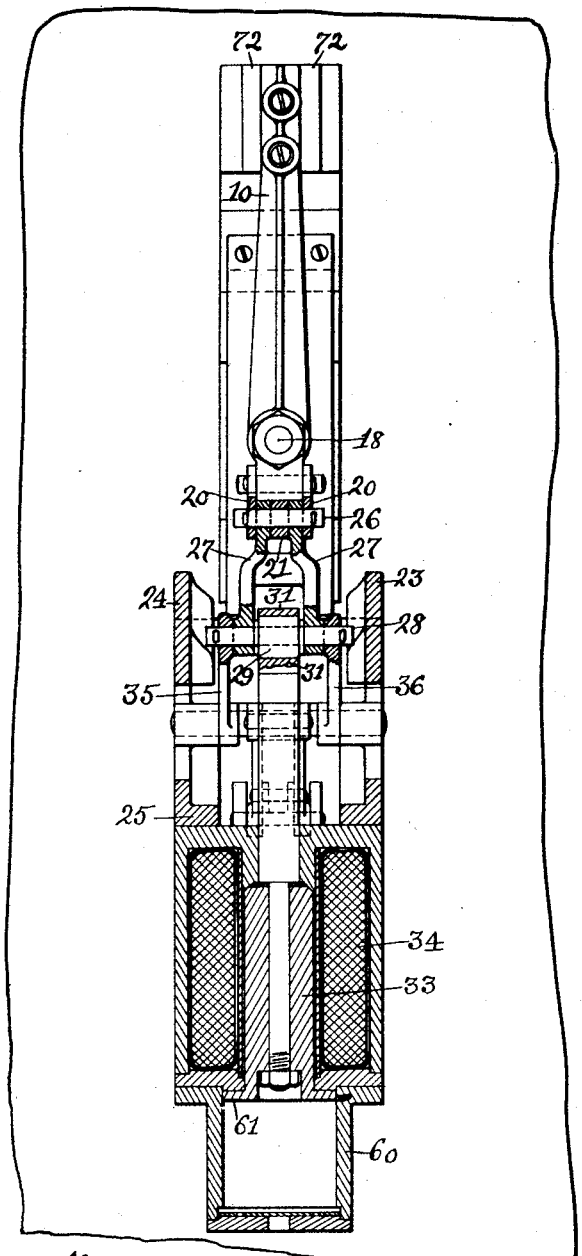
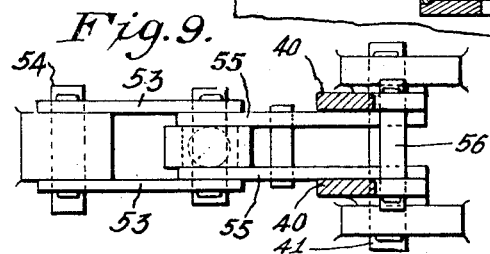

Patented Mar. 10, 1931

1,796,229

UNITED STATES PATENT OFFICE

JOHAN M. ANDERSEN, OF BROOKLINE, MASSACHUSETTS, ASSIGNOR TO ALBERT & J. M. ANDERSON MANUFACTURING COMPANY, OF BOSTON, MASSACHUSETTS, A CORPORATION OF MASSACHUSETTS

CIRCUIT CONTROLLER

Application filed June 19, 1924. Serial No. 720,974.

This invention relates to circuit controllers of that class in which the movable member of the circuit controller is moved by a toggle. The invention has for one of its objects to provide a circuit controller of the character described, in which the final closing movement of the movable member is effected by a substantially direct thrust upon the toggle.

The invention also has for its object to provide a simple, compact, highly efficient and superior circuit controller of the character referred to.

The invention further has for its object to couple together two or more of said circuit controllers so that both may be in an open condition at the same time but so that both cannot be in a closed condition at the same time, and so that when one is closed the other is open and cannot be closed until the closed one is first opened.

These and other features of this invention will be pointed out in the claims at the end of this specification.

Fig. 1 represents in side elevation two of the improved electric circuit controllers or switches mounted on a panel and coupled together, with the upper switch closed and with the lower switch open and locked in such position.

Fig. 2, a view like Fig. 1, with both switches open and unlocked and either capable of being closed.

Figure 3:
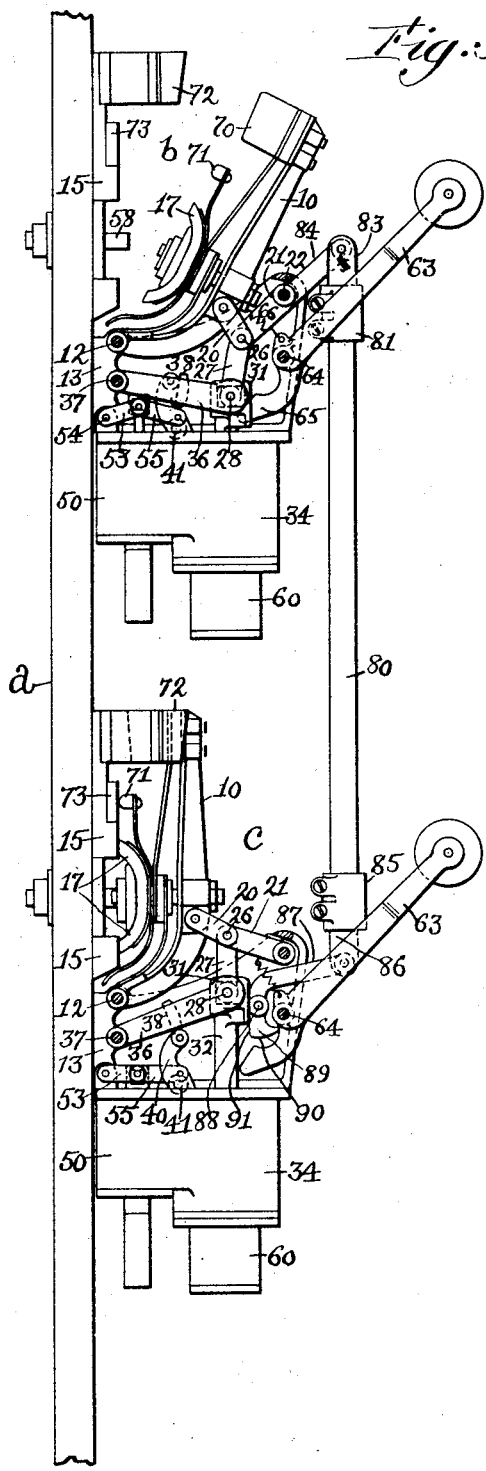

Fig. 3, a view like Fig. 1, with the upper switch open and locked in this position and with the lower switch closed.

Fig. 4, a side elevation on a larger scale of the upper switch shown in its closed position.

Figure 5:
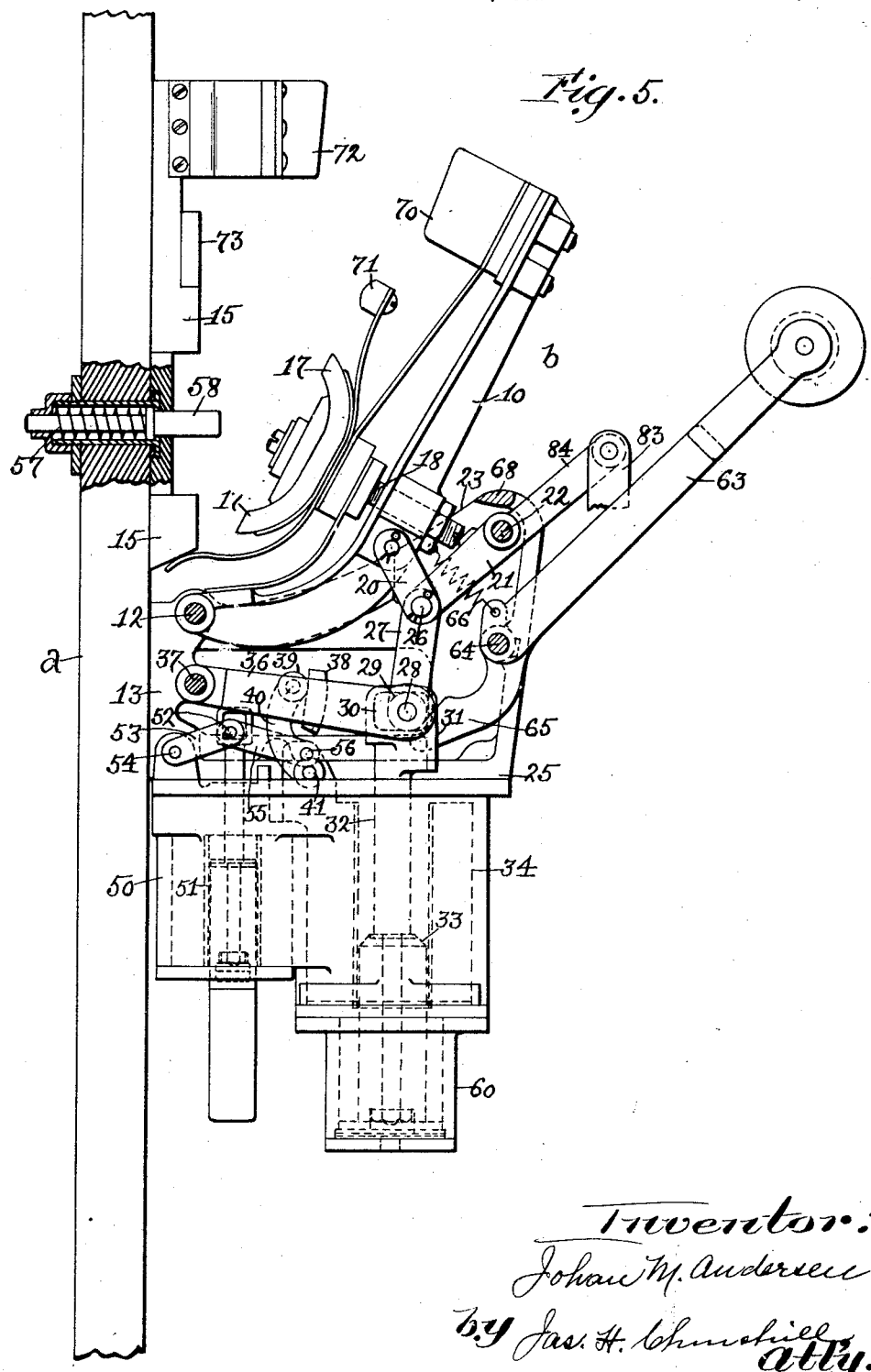

Fig. 5, a view like Fig. 4, with the upper switch in its open position.

Figure 6:
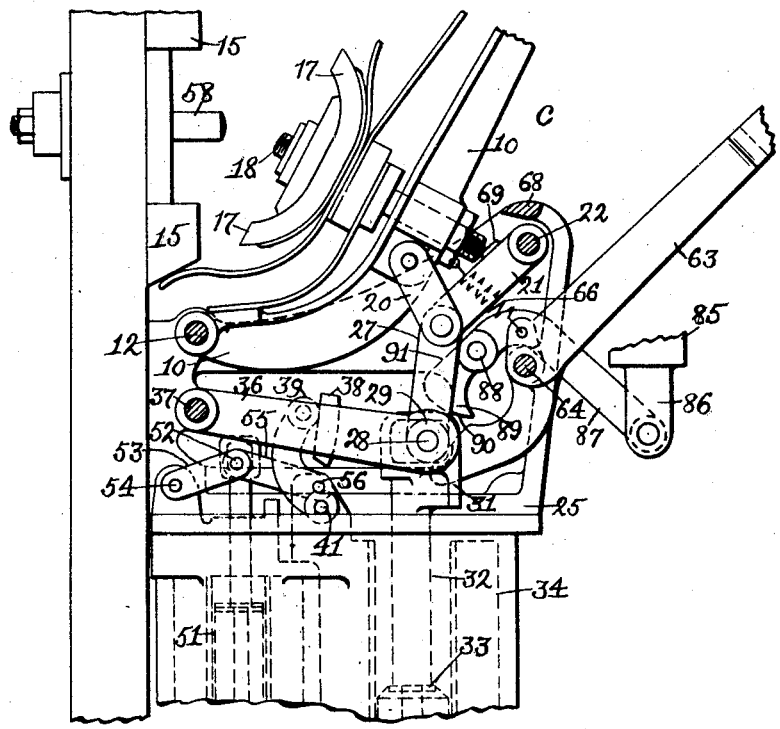

Fig. 6, a side elevation on a larger scale of the lower switch shown in its open position.

Figure 7:
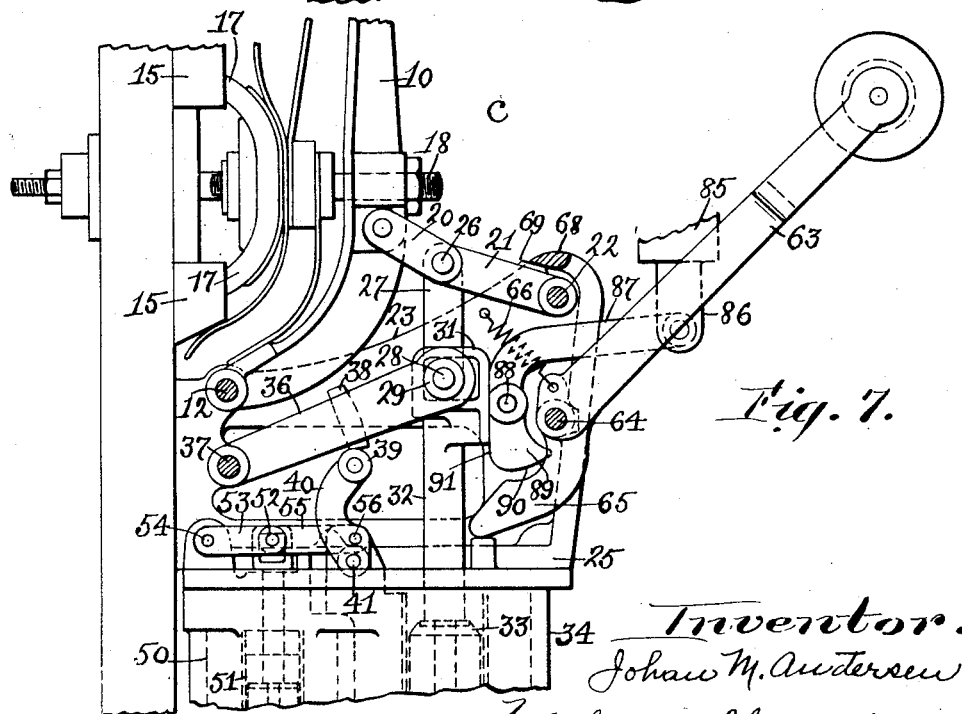

Fig. 7, a view like Fig. 6, with the lower switch in its closed position.

Figure 8:
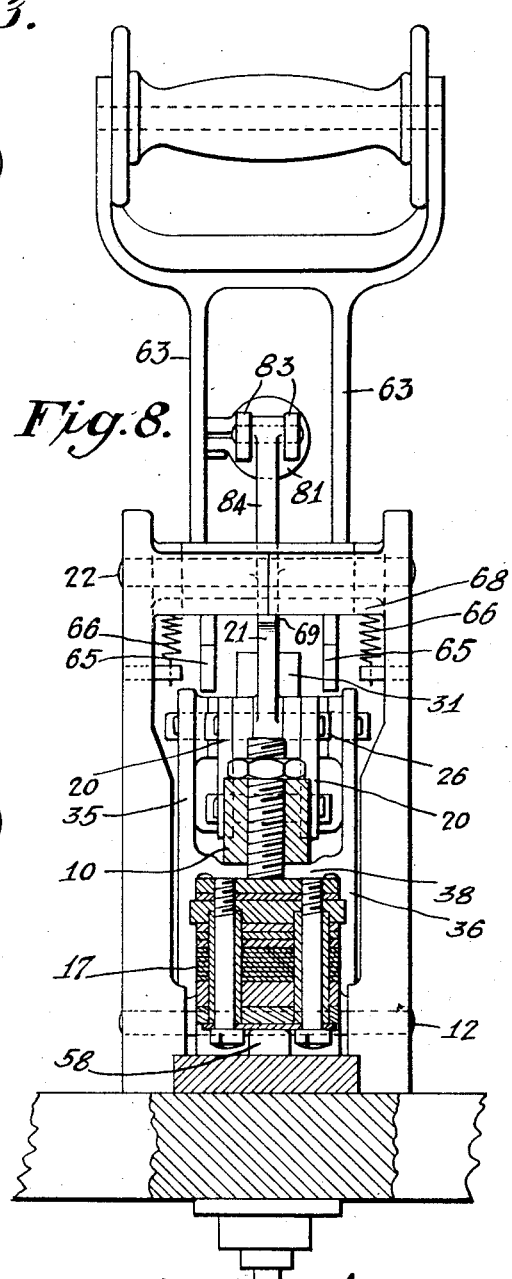

Fig. 8, a plan section on the line 8—8 Fig. 4.

Fig. 9, a detail in section on the line 9—9 Fig. 4 and

Fig. 10, a vertical section on the line 10—10 Fig. 4.

Referring to the drawings *a* represents a panel or switchboard upon which are mounted two switches *b*, *c*, which will be hereinafter referred to as the upper and lower switches, and which are of like construction and a detailed description of the upper switch *b* will suffice for both.

Referring to Figs. 4 and 5, the switch *b* shown therein is provided with a lever 10 which is pivoted at its lower end at 12 to a supporting member 13 attached to the panel or board *a* of insulating material, which also has attached to it stationary contact members 15 spaced apart and with which cooperate a movable contact member 17, which may be affixed to the lever 10 by the screw 18 as herein represented or in any other suitable manner. The lever 10 constitutes a carrier for the movable contact member 17, and the present invention has for one of its objects to provide a novel mechanism for operating the movable carrier for the contact member 17, whereby the latter may be forced into contact with the stationary contact members with a practically direct thrust.

The invention further has for its object to provide an operating mechanism which is simple, highly efficient and enables the circuit controller to be constructed, operated and maintained at minimum cost, and which further enables the operating parts to be compactly assembled and yet obtain a wide opening of the movable member of the switch or circuit controller.

The operating mechanism referred to, comprises as herein shown a toggle connected to the carrier 10 for the movable contact member 17, a member for moving said toggle, and a pin and slot connection between said latter member and said toggle, and said parts are constructed and arranged so that when the movable contact member is engaged with the stationary contact member in its closing movement, the center pin of the toggle, and the pin of the pin and slot connection will be in substantially the same plane and will function like a rigid device to exert a direct thrust upon the center pin of the toggle and thereby utilize the full power of the energy employed in forcing the movable contact member against the stationary contact members to obtain an electrical connection of maximum efficiency.

In the present instance the toggle comprises levers 20, 21, the lever 20 being pivotally connected at one end to the lever 10 and the lever 21 being mounted on a rod or pin 22 supported by side walls 23, 24, of an open metal frame 25, of which the member 13 forms the rear wall thereof. The levers 20, 21, are connected by the center pin 26, to which is pivotally connected the upper end of a link 27 provided at its lower end with a pin 28, preferably carrying a roll 29, which is extended into a slot 30 in the head 31 of a rod 32 attached to or forming part of the core 33 of a solenoid or magnet 34 depending from and supported by the frame 25.

The head 31 is enlarged transversely with relation to the rod 32, and its slot 30 is extended laterally with relation to the rod 32 and is made of sufficient length to enable the center of the pin 28 to be carried to one side of the longitudinal center of the rod 32 when the movable contact member 17 is in its open position, as shown in Fig. 5.

The slot 30 is also arranged so that its other or what may be termed its inner end, is in such relation to the longitudinal center of the rod 32 that the center of the pin 28 will be substantially in line with the longitudinal center of the rod 32, when the movable contact member is in its closed position represented in Fig. 1; and the toggle levers 20, 21 are constructed and arranged so that when the movable contact member 17 is in its closed position, the center of the center pin 26 will also be substantially in alignment with the pin 28 and rod 32. By reference to Fig. 4, it will be seen that the connection between the core 33 and the center pin 26 of the toggle is in effect a rigid connection, and the core 33 acts on the center pin 26 of the toggle with a direct thrust, and as a result, the full power of the magnet or solenoid 34 is utilized in closing the switch.

Provision is made for holding or locking the movable contact member in its closed position, and for this purpose the pin 28 of the pin and slot connection has connected to its opposite ends levers 35, 36, which have their other ends pivotally connected with the frame 25 by a rod 37, and said levers are connected together to move as one piece by a crossbar 38 located between their ends, (see Figs. 4, 5, and 8). The cross bar 38 has cooperating with it a roll 39 on the upper end of a lever 40 pivoted at 41 to the frame 25, and the lever 40 is designed to be moved so that its roll 39 is brought under and in line with the cross bar 38 when the movable member 17 of the switch is in its closed position, as shown in Fig. 4, thus preventing downward movement of the levers 35, 36 until the roll 39 is removed from beneath the cross bar 38, and enabling the solenoid 34 to be denergized. The roll 39 is removed in the present instance by a solenoid or magnet 50, whose core 51 is connected with the center pin 52 of a toggle, one lever 53 of which is pivoted at 54 to the frame 25, and the other lever 55 of which is pivotally connected with the locking lever 40 at 56, which point of connection is above the pivot 41 for the lever 40, so that when the toggle 53, 55 is broken by energizing the solenoid 50, the lever 40 is moved to the left, viewing Fig. 4, and the roll 39 is removed from under the cross bar 38, which allows the movable member 17 of the switch to be moved into its open position shown in Fig. 2, by the spring 57 and plunger 58 assisted by gravity, in a manner well understood.

The solenoid 50 is designed to be controlled from a distant point or station by means of a suitable hand switch, not shown, but which is included in circuit with the solenoid 50 in a manner well understood.

The solenoid 50 is commonly designated the tripping coil. Provision is made for cushioning the movable switch member in its opening movement, and to this end a dash pot 60 is attached to the closing solenoid 34, and a piston 61 therein is attached to the core 33 of the said solenoid.

The dash pot may be of any suitable construction such as commonly used in switches or circuit breakers. The solenoid 34 is also designed to be controlled from the distant point or station in a manner well understood.

Provision is made for closing the switch by hand, and for this purpose, a hand-operated lever 63 is mounted on a pivot pin or rod 64 supported by the frame 25, and has an arm 65, which is designed to engage the pin 28 of the pin and slot connection, and lift the same and the parts connected with it, from the position shown in Figs. 2 and 5 into that shown in Figs. 1 and 4. As soon as the switch has been closed by the hand-operated lever 63, the latter is returned to its starting position shown in Fig. 5 by the spring 66.

Provision is made for positively limiting the closing movement of the movable switch member, and for this purpose the frame 25 is provided with a cross bar 68 connecting its side walls 23, 24, which cross bar co-operates with and is engaged by a projection 69 on the toggle lever 21, as represented in Fig. 4. These parts are arranged so that the projection 69 will engage the cross bar 68 at or about the time the final pressure is placed upon the movable contact member 17 and so as to prevent the center pin 26 being carried beyond the center of the toggle.

The circuit controller or switch may be provided with auxiliary movable contact members 70, 71, which co-operate with auxiliary stationary contact members 72, 73 as now commonly practised.

By reference to Fig. 6, it will be seen that when the switch is open, the pin 28 and the roll 29 thereon are at the outer end of the slot 30, which is materially displaced laterally with relation to the longitudinal center of the core 33 of the closing solenoid, and that the center pin 26 of the toggle 20, 21 is similarly displaced laterally. When, however, the core 33 is moved upwardly by energizing the solenoid 34, the pin 28 and roll 29 are moved upwardly as is also the center pin 26 of the toggle, and at the time said pins and roll are moved laterally toward a vertical plane through the longitudinal axis of the core 33.

As the center pin 26 of the toggle is moved upwardly, the movable contact member 17 is moved toward the stationary contact members 15, and the operating parts are constructed and arranged so that the pin 28 and roll 29 are moved to the inner end of the slot 30 by the levers 35, 36, and have their centers in or substantially in the vertical plane through the longitudinal axis of the core, and the center pin 26 of the toggle is substantially in the same plane just prior to the time the upward movement of the core ceases, so that when the core is making the final portion of its upward movement, the pins 26, 28 and core 33 are substantially in alignment, so that in effect there is provided a rigid connection between the core and the toggles 20 21, with the result that the thrust of the core 33 is direct upon the center pin 26 of the toggle, and the full power of the closing solenoid 34 or of the hand-operated lever 63 is utilized in forcing the movable contact member 17 against the stationary contacts, whereby a superior effect is obtained.

It is preferred to use the roll 29 on the pin 28 as friction is thereby reduced, which avoids wear and diminishes the amount of current required to close the switch, consequently enabling the cost of construction and maintenance to be reduced to a minimum.

It will be further observed that the operating mechanism for the movable switch member is constructed and arranged so as to obtain a relatively compact switch, in which a relatively wide or large opening is obtained between the co-operating contact members in the open position of the switch. Provision is made for coupling together the switches b, c, so that both may be open at the same time but both cannot be closed at the same time, and so that when one switch is closed the other is open and cannot be closed until the closed switch is first opened. Electric switches thus coupled are highly useful in many places or stations.

In the present instance is illustrated one construction of coupling mechanism which may be preferred and which consists of a bar or rod 80 provided at its upper end with a cap 81 having an extension 83 pivotally connected with the arm 84 of the toggle lever 21, and having at its lower end a cap 85 provided with an extension 86 which is pivotally connected with a lever 87, having its pivot 88 supported by the frame 25 of the lower switch c. The lever 87 is provided with a relatively short arm 89 having a curved end face 90 and also having a straight rear side or face 91. The lever 87 is pivoted in a position with relation to the slotted head 31 of the lower switch c, so that when the said head is in its elevated position shown in Fig. 3, in which position the switch c is closed, the said head is in position to engage the straight rear face 91 of the lever 87 and prevent said lever being turned a sufficient distance to enable the rod or bar 80 to be moved downward and permit the upper switch to be opened.

It will thus be seen by reference to Fig. 3 that when the lower switch c is closed and the upper switch b is opened, the slotted head 31 of the lower switch co-operates with the lever 87 to lock the upper switch b in its open position, which cannot be closed until the slotted head 31 of the lower switch c is first removed from the path of movement of the locking lever 87, which is effected by opening the lower switch. When the lower switch c is thus opened, the slotted head 31 thereof is moved downward from the position shown in Fig. 3 into the position shown in Fig. 2, in which latter position the slotted head 31 is below and out of the path of movement of the arm 89 of the lever 87, and the latter is free to be turned on its pivot into the position shown in Fig. 1, when the upper switch b is closed, either by energizing the solenoid 34 of the upper switch b or by manipulating the hand lever 63 of said upper switch. When the upper switch b is closed, its toggle 20, 21, is moved from its broken position shown in Fig. 2 into its straightened position shown in Fig. 1, and the arm 84 of the toggle lever 21 moves the rod or bar 80 downward, and the latter turns the lever 87 so as to bring the short arm 89 of the lever 87 above and into the path of the slotted head 31 of the lower switch c, as shown in Fig. 1, in which position the lower switch c is prevented from being closed and is therefore locked in its open position. When it is desired to close the lower switch c the upper switch b must first be opened, and when this is done, the rod 80 is moved upwardly from the position shown in Fig. 1 into that shown in Fig. 2, which turns the lever 87 so as to remove its short arm 89 from the path of the slotted head 31 of the lower switch c and into the position shown in Fig. 2, thus unlocking the lower switch c and permitting it to be closed. By reference to Fig. 2, it will be seen that when both switches $b$, $c$, are open, either switch can be closed, and that when either switch is closed the other switch is locked in its open position and cannot be closed.

In Fig. 1, the upper switch $b$ is closed and the lower switch $c$ is locked in its open position, and in Fig. 3, the lower switch is closed and the upper switch is locked in its open position.

It will also be observed, that to unlock the open switch so as to permit it to be closed, it is first necessary to open the closed switch. It will thus be seen, that while both switches may be in their open position or condition at the same time they cannot be in their closed position or condition at the same time, whereby serious accidents are avoided under certain conditions of use.

Claims:

1. In a circuit controller, in combination, a contact carrier movable into an open and a closed position, a toggle to move said carrier into its closed position and means for actuating said toggle, said actuating means having a member movable in a fixed path in a plane transversely through the toggle in the closed position of the contact carrier, and having a second member connected with said first member to move therewith in said fixed path and to be moved laterally with relation thereto and independently thereof.

2. In a circuit controller, in combination, a contact carrier movable into an open and a closed position, a toggle to move said carrier into its closed position, a link pivotally connected at one end to said toggle and having its free end movable laterally with relation to a plane through said pivotal connection and lengthwise of said link in the closed position of said contact carrier, a lever pivotally connected with the free end of said link to effect movement of said free end laterally with relation to said plane, and means for moving said lever, said means being movable in a fixed path in a plane transversely through the toggle in the closed position of the contact carrier.

3. In a circuit controller, in combination, a contact carrier movable into an open and closed postion, a toggle to move said carrier into its closed postion, a link pivotally connected at one end to said toggle and having its free end movable laterally with relation to a plane through said pivotal connection and lengthwise of said link in the closed position of said contact carrier, a lever pivotally connected with the free end of said link to effect movement of said free end laterally with relation to said plane, means movable in a fixed path in a plane transversely through the toggle in the closed position of the contact carrier for moving said lever, and means for locking said lever with the contact carrier in its closed position.

4. In a circuit controller, in combination, a contact carrier movable into an open and a closed postion, a toggle to move said carrier into its closed postion, a link pivotally connected at one end to said toggle and having its free end movable laterally with relation to a plane through said pivotal connection and lengthwise of said link in the closed position of said contact carrier, a lever pivotally connected with the free end of said link to effect movement of said free end laterally with relation to said plane, means movable in a fixed path in a plane transversely through the toggle in the closed position of the contact carrier for moving said lever, and means co-operating with said toggle to limit movement of the latter toward its straightened position.

5. In a circuit controller, in combination, a contact carrier movable into an open and a closed position, a toggle to move said carrier into its closed position, a link pivotally connected at one end to said toggle and having its free end movable laterally with relation to a plane through said pivotal connection and lengthwise of said link in the closed position of said contact carrier, a lever pivotally connected with the free end of said link to effect movement of said free end laterally with relation to said plane, and a solenoid having its core reciprocating in said plane and operatively connected with said lever to permit lateral movement of said link.

6. In a circuit controller, in combination, a contact carrier movable into an open and a closed position, a toggle to move said carrier into its closed position, a link pivotally connected with said toggle and having its free end movable laterally with relation to a plane through said pivotal connection and lengthwise of said link in the closed position of said contact carrier, a solenoid having its core reciprocating in said plane and provided with a head having a slot extended laterally beyond said plane, a pin on the free end of said link extended into said slot and movable into and out of said plane, and a lever connected with said pin to effect movement of the said pin in said slot.

7. In a circuit controller, in combination, a contact carrier movable into an open and a closed position, a toggle to move said carrier into its closed position, a link pivotally connected with said toggle and having its free end movable laterally with relation to a plane through said pivotal connection and lengthwise of said link in the closed position of said contact carrier, a device movable in said plane, a pin and slot connection between said device and link, and means for moving said pin in said slot to effect movement of said pin into and out of said plane.

8. The combination with a plurality of circuit controllers provided with movable contact members, toggle levers for moving said contact members, actuating mechanism for said toggle levers a locking lever co-operating with the actuating mechanism of one of said circuit controllers and movable into and out of the path of movement of said actuating mechanism, and a rod connecting said locking lever with the toggle levers of the other of said circuit controllers to be actuated thereby.

9. The combination with a plurality of circuit controllers provided with movable contact members, toggle levers for moving said contact members, actuating mechanism for said toggle levers, a locking lever co-operating with the actuating mechanism of one of said circuit controllers and movable into and out of the path of movement of said actuating mechanism, and means connecting said locking lever with the toggle levers of the other of said circuit controllers to be actuated thereby.

10. The combination with a plurality of circuit controllers provided with movable contact members and with actuating mechanisms therefor, the actuating mechanism of one of said circuit controllers having a reciprocating member, of a locking lever co-operating with the said reciprocating member and movable into and out of the path of movement thereof, and mechanical means connecting the said locking lever with the actuating mechanism for the second circuit controller to move the locking lever into the path of the said reciprocating member when the second circuit controller is closed, and to move the locking lever out of the path of the said reciprocating member when the second circuit controller is opened, whereby either circuit controller may be closed independently of the other when both circuit controllers are in their open position and whereby when either circuit controller is closed, the other circuit controller is locked in its open position.

11. The combination with a plurality of circuit controllers provided with movable contact members and with actuating mechanisms therefor, of a locking lever mechanically connected with the actuating mechanism of one of said movable contact members to be moved into operative and inoperative relation to the actuating mechanism of the other of said movable contact members, said locking lever being moved into its operative position when the contact member of the first-mentioned circuit controller is moved into its closed position and being moved into its inoperative position when the contact member of said first-mentioned circuit controller is moved into its open position.

In testimony whereof, I have signed my name to this specification.

JOHAN M. ANDERSEN.